United States Patent
Shveidel et al.

(10) Patent No.: US 11,662,946 B2
(45) Date of Patent: May 30, 2023

(54) PRIORITY-AWARE INTERNODE MESSAGING FOR ACTIVE-ACTIVE STORAGE SYSTEM

(71) Applicant: EMC IP Holding Company LLC, Hopkinton, MA (US)

(72) Inventors: Vladimir Shveidel, Pardes-Hana (IL); Geng Han, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 144 days.

(21) Appl. No.: 17/227,526

(22) Filed: Apr. 12, 2021

(65) Prior Publication Data
US 2022/0326882 A1    Oct. 13, 2022

(51) Int. Cl.
*G06F 3/06* (2006.01)

(52) U.S. Cl.
CPC ............ *G06F 3/0659* (2013.01); *G06F 3/067* (2013.01); *G06F 3/0611* (2013.01); *G06F 3/0635* (2013.01)

(58) Field of Classification Search
CPC .... G06F 3/0659; G06F 3/0611; G06F 3/0635; G06F 3/067
See application file for complete search history.

(56) References Cited

U.S. PATENT DOCUMENTS

| | | | |
|---|---|---|---|
| 9,544,873 B2 * | 1/2017 | Lie | H04W 68/00 |
| 10,146,646 B1 | 12/2018 | Foley et al. | |
| 10,445,295 B1 | 10/2019 | Han et al. | |
| 11,336,580 B2 * | 5/2022 | Ying | H04L 45/302 |

OTHER PUBLICATIONS

Shveidel, Vladimir, et al.; "Scheduling Storage System Tasks to Promote Low Latency and Sustainability," U.S. Appl. No. 17/148,872, filed Jan. 14, 2021.
Shveidel, Vladimir, et al.; "RPC-Less Locking Mechanism Based on RDMA CAW for Storage Cluster With Active-Active Architecture," U.S. Appl. No. 17/145,625, filed Jan. 11, 2021.
Shveidel, Vladimir, et al.; "Optimizing Write IO Bandwidth and Latency in an Active-Active Clustered System Using Storage Object Affinity to a Single Storage Node," U.S. Appl. No. 16/738,405, filed Jan. 9, 2020.

* cited by examiner

Primary Examiner — Idriss N Alrobaye
Assistant Examiner — Richard B Franklin
(74) Attorney, Agent, or Firm — BainwoodHuang (57) ABSTRACT

A technique for managing messaging between storage nodes of a storage system includes a first storage node delaying the sending of non-latency-critical messages to a second storage node until the first storage node has a latency-critical message to be sent. The technique further includes combining the non-latency-critical messages with the latency-critical message to form a single, aggregated message, and sending the aggregated message to the second storage node.

20 Claims, 4 Drawing Sheets

PRIORITY-AWARE INTERNODE MESSAGING FOR ACTIVE-ACTIVE STORAGE SYSTEM

BACKGROUND

Data storage systems are arrangements of hardware and software in which storage processors are coupled to arrays of non-volatile storage devices, such as magnetic disk drives, electronic flash drives, and/or optical drives. The storage processors service storage requests, arriving from host machines ("hosts"), which specify blocks, files, and/or other data elements to be written, read, created, deleted, and so forth. Software running on the storage processors manages incoming storage requests and performs various data processing tasks to organize and secure the data elements on the non-volatile storage devices.

Some data storage systems provide active-active access, in which two or more storage processors, also referred to herein as "storage nodes" or simply "nodes," are capable of serving storage requests for the same data elements. For example, a storage system may include two nodes, Node A and Node B, which both provide access to the same file or to the same range of blocks in a LUN (Logical UNit Number, which refers to a logical disk).

Storage nodes configured in active-active arrangements typically send messages back and forth to remain in synch. For example, if Node A receives a request from a host to write to a specified block in a LUN, Node A may attempt to obtain a lock on the specified block. To this end, Node A may send a request message to Node B asking whether the lock may be taken. Node B may then send a reply message indicating yes or no. Assuming the lock is taken, another pair of messages may follow when the lock is released. In a busy storage system, many such messages may be sent back and forth between storage nodes. A separate bus and/or cable may be provided for conveying the messages.

SUMMARY

Storage systems continue to become faster and more capable. The adoption of solid-state drives for storing user data has greatly increased the throughput of many storage systems. A consequence of this increased throughput is that many functions of storage systems, which previously were negligible in terms of performance impact, are now becoming significant. As an example, the faster the storage media, the greater the rate of messages needed for maintaining synchronization between storage nodes. Internode messaging has become a larger consumer of processing and communication resources and indeed is becoming a limiting factor in providing the best possible performance. What is needed is a way of improving the efficiency of internode messaging in a storage system.

This need is addressed at least in part by an improved technique for managing messaging between storage nodes of a storage system. The technique includes a first storage node delaying the sending of non-latency-critical messages to a second storage node until the first storage node has a latency-critical message to be sent. The technique further includes combining the non-latency-critical messages with the latency-critical message to form a single, aggregated message, and sending the aggregated message to the second storage node.

Advantageously, the improved technique greatly reduces the number of messages sent. Each message involves a certain amount of processing and communications overhead, and avoiding the overhead by combining multiple messages into one aggregated message conserves valuable processing and communications resources, freeing those resources for use in more critical tasks.

Certain embodiments are directed to a method of managing messaging between storage nodes of a data storage system. The method includes preparing, by a first storage node, a set of non-latency-critical (NLC) messages for transmission to a second storage node. The method further includes delaying transmission of the set of NLC messages from the first storage node to the second storage node and, in response to the first storage node preparing a latency-critical (LC) message for transmission to the second storage node, (i) forming an aggregated message that includes the set of NLC messages together with the LC message and (ii) sending the aggregated message from the first storage node to the second storage node.

In some examples, delaying transmission of the set of NLC messages includes placing the set of NLC messages in a queue maintained in memory of the first storage node and holding the set of NLC messages in the queue until responding to preparation of the LC message.

In some examples, the queue stores additional NLC messages in addition to the set of NLC messages, and forming the aggregated message includes obtaining the set of NLC messages from the queue as a set of oldest NLC messages in the queue.

In some examples, forming the aggregated message further includes creating an index of messages in the aggregated message and incorporating the index as part of the aggregated message.

In some examples, the data storage system specifies a maximum size of messages, and forming the aggregated message includes packing as many NLC messages from the queue as fit within the maximum size, while still providing space for the LC message and the index.

In some examples, the method further includes periodically checking the queue for a time associated with an oldest NLC message in the queue and, in response to a difference between a current time and the time associated with the oldest NLC message exceeding a predetermined threshold, (i) forming a new aggregated message that includes a plurality of oldest NLC messages in the queue and (ii) sending the new aggregated message from the first storage node to the second storage node.

In some examples, the set of NLC messages includes multiple messages for synchronizing background activities of the data storage system, and the LC message is a message for synchronizing a host-initiated I/O request activity of the data storage system.

In some examples, the method further includes providing a first API (Application Program Interface) for preparing LC messages and providing a second API for preparing NLC messages.

In some examples, the method further includes, upon preparing a new NLC message using the second API, placing the new NLC message onto the queue.

Upon preparing a new LC message using the first API, the method further includes (i) checking the queue for NLC messages waiting in the queue and (ii) in response to finding NLC messages waiting in the queue, forming a new aggregated message that includes the new LC message and at least one of the NLC messages waiting in the queue. The method still further includes sending the new aggregated message from the first storage node to the second storage node.

In some examples, a new message prepared by one of the first API and the second API includes a flag that identifies the API used to prepare the new message, and the method further includes the second storage node receiving the new message, checking the flag, and preparing a reply message to the new message using the API specified by the flag.

In some examples, a new message is received by the second storage node in an aggregated message that includes multiple new messages. The new messages include respective flags that identify respective APIs used in preparing the respective messages, and the method further includes the second storage node preparing reply messages to the new messages using the respective APIs specified by the respective flags.

Other embodiments are directed to a computerized apparatus constructed and arranged to perform a method of managing messaging between storage nodes, such as the method described above. Still other embodiments are directed to a computer program product. The computer program product stores instructions which, when executed on control circuitry of a computerized apparatus, cause the computerized apparatus to perform a method of managing messaging between storage nodes, such as the method described above.

The foregoing summary is presented for illustrative purposes to assist the reader in readily grasping example features presented herein; however, this summary is not intended to set forth required elements or to limit embodiments hereof in any way. One should appreciate that the above-described features can be combined in any manner that makes technological sense, and that all such combinations are intended to be disclosed herein, regardless of whether such combinations are identified explicitly or not.

BRIEF DESCRIPTION OF THE SEVERAL VIEWS OF THE DRAWINGS

The foregoing and other features and advantages will be apparent from the following description of particular embodiments, as illustrated in the accompanying drawings, in which like reference characters refer to the same or similar parts throughout the different views.

DETAILED DESCRIPTION

Embodiments of the improved technique will now be described. One should appreciate that such embodiments are provided by way of example to illustrate certain features and principles but are not intended to be limiting.

An improved technique for managing messaging between storage nodes of a storage system includes a first storage node delaying the sending of non-latency-critical messages to a second storage node until the first storage node has a latency-critical message to be sent. The technique further includes combining the non-latency-critical messages with the latency-critical message to form a single, aggregated message, and sending the aggregated message to the second storage node.

Figure 1:
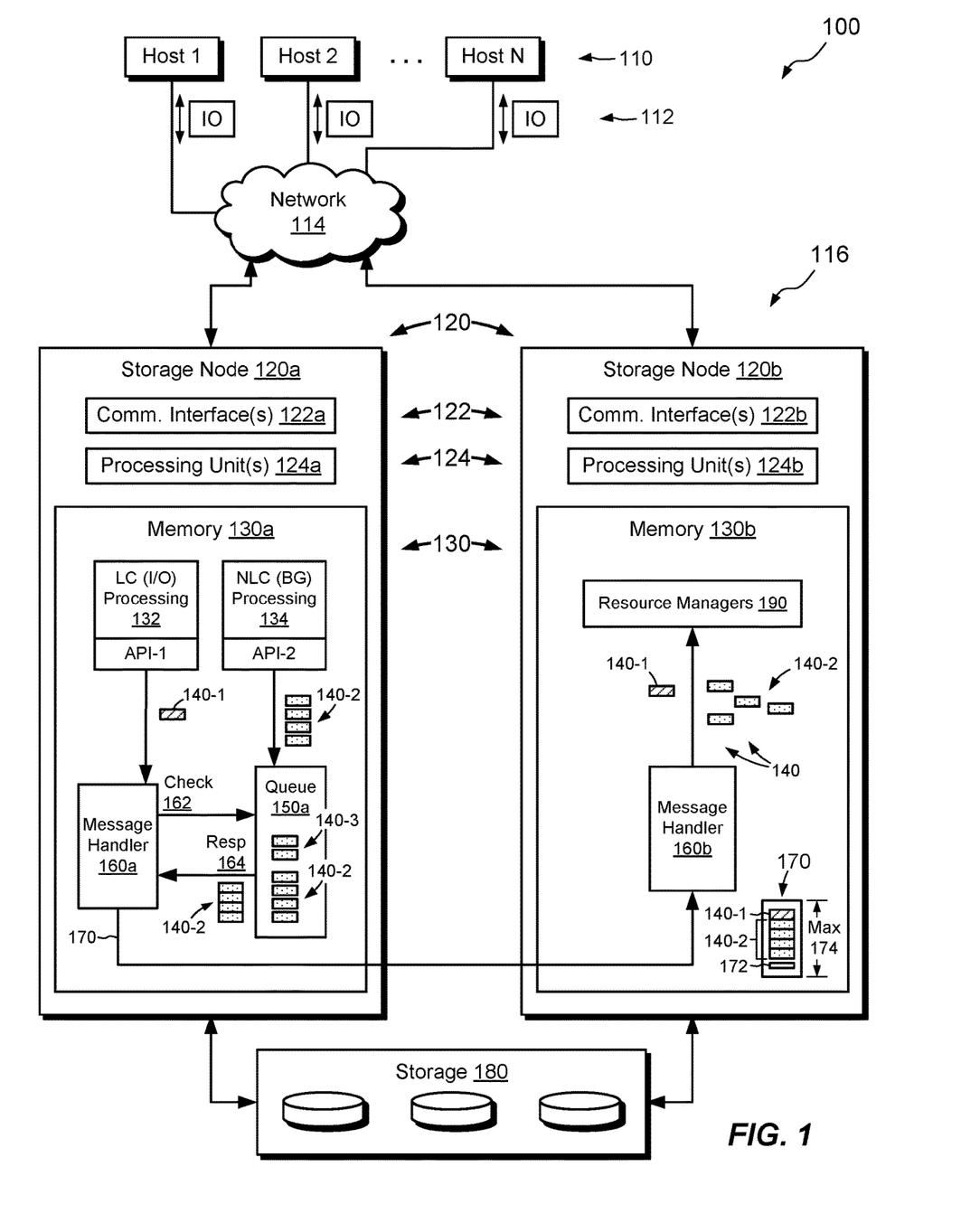
FIG. 1 is a block diagram of an example environment in which embodiments of the improved technique can be practiced.

FIG. 1 shows an example environment 100 in which embodiments of the improved technique can be practiced. Here, multiple hosts 110 are configured to access a data storage system 116 over a network 114. The data storage system 116 includes multiple storage nodes 120, such as a first node 120a and a second node 120b, as well as storage 180, such as magnetic disk drives, electronic flash drives, and/or the like. Storage nodes 120 may be provided as circuit board assemblies or blades, which plug into a chassis that encloses and cools the storage nodes. The chassis may have a backplane or midplane for interconnecting the storage nodes, and additional connections may be made among storage nodes using cables. In some examples, the data storage system 116 is provided as a storage cluster or appliance, which includes two nodes 120 that share the storage 180. In some arrangements, one or more host applications run directly on the storage nodes 120, such that separate host machines 110 need not be present. No particular hardware configuration is required, however, as storage nodes 120 may be provided in any arrangement and each node 120 may be any type of computing device capable of running software and processing host I/O's.

The network 114 may be any type of network or combination of networks, such as a storage area network (SAN), a local area network (LAN), a wide area network (WAN), the Internet, and/or some other type of network or combination of networks, for example. In cases where host machines 110 are provided, such hosts 110 may connect to the storage nodes 120 using various technologies, such as Fibre Channel, iSCSI (Internet small computer system interface), NVMeOF (Nonvolatile Memory Express (NVME) over Fabrics), NFS (network file system), and CIFS (common Internet file system), for example. As is known, Fibre Channel, iSCSI, and NVMeOF are block-based protocols, whereas NFS and CIFS are file-based protocols. Each storage node 120 is configured to receive I/O requests 112 according to block-based and/or file-based protocols and to respond to such I/O requests 112 by reading or writing the storage 180.

Storage nodes 120 may be similarly configured, although they need not be identical. In an example, each storage node 120 includes one or more communication interfaces 122 (122a or 122b), a set of processing units 124 (124a or 124b), and memory 130 (130a or 130b). The communication interfaces 122 include, for example, SCSI target adapters and/or network interface adapters for converting electronic and/or optical signals received over the network 114 to electronic form for use by the respective storage node 120. The set of processing units 124 includes one or more processing chips and/or assemblies, such as numerous multi-core CPUs (central processing units). The memory 130 of each storage node includes both volatile memory, e.g., RAM (Random Access Memory), and non-volatile memory, such as one or more ROMs (Read-Only Memories), disk drives, solid state drives, and the like. The set of processing units 124 and the memory 130 of each node 120 together form control circuitry, which is constructed and arranged to carry out various methods and functions as described herein. Also, each memory 130 includes a variety of software constructs realized in the form of executable instructions. When the executable instructions are run by the respective set of processing units 124, the set of processing units 124 carries out the operations of the software constructs. Although certain software constructs are specifically shown and described, it is understood that each memory 130 typically includes many other software components, which are not shown, such as an operating system, various applications, processes, and daemons.

As further shown in FIG. 1, the memory 130 of each storage node "includes," i.e., realizes by execution of software instructions, various constructs and functions. For example, the memory 130a of storage node 120a includes latency-critical (LC) processing 132, non-latency-critical (NLC) processing 134, a message handler 160a, and a queue 150a. The memory 130b of storage node 120b includes a message handler 160b and resource managers 190. Despite the apparent differences between nodes the 120a and 120b, the relevant configurations of software on the two nodes 120 may be similar to each other to allow for symmetrical behavior. Such behavior may be desirable for supporting active-active functionality, e.g., an arrangement in which both nodes 120 may receive and process I/O requests 112 for accessing the same host-accessible data objects in storage 180. Examples of host-accessible data objects may include LUNs, file systems, and vVols (virtual volumes).

In example operation, hosts 110 issue I/O requests 112 to the data storage system 116. The storage nodes 120 receive the I/O requests 112 at the respective communication interfaces 122 and initiate further processing. Such processing may include responding directly to I/O requests 112 to read and/or write data objects in storage 180, e.g., by returning the requested data for read requests and by persisting specified data for write requests. This direct I/O processing may be considered as latency-critical (LC) processing 132, given that fast responses to reads and writes may be essential for enabling the data storage system 116 to meet its service-level requirements. Processing by the storage nodes 120 may further include background activities, such as destaging data from a persistent data log (not shown) to more permanent storage structures, garbage collection, and numerous other tasks that the data storage system 116 may be required to perform eventually, but not necessarily immediately. Such background activities may be considered as non-latency-critical (NLC) processing 134.

Both LC processing 132 and NLC processing 134 typically generate many internode messages, i.e., messages between storage nodes 120. Such messages may be necessary to maintain coherence and avoid resource conflicts. Internode messages may be exchanged over the network 114, over a bus or cabling (not shown) that directly connects the storage nodes 120, or in any other suitable manner.

In some examples, the assignment of processing tasks to LC or NLC processing may be made by the system developer. For example, a developer may assign a direct I/O task to LC processing 132 but may assign a background (BG) task to NLC processing 134. Although direct I/O processing tasks may almost always be considered LC processing 132, LC processing 132 is not necessarily limited to direct I/O tasks. For instance, certain background tasks that are urgent may be categorized as LC processing 132. Thus, the manner of categorizing tasks as LC or NLC processing is intended to be flexible.

In an example, the storage system 116 supports two different APIs (application program interfaces) for performing internode messaging. These APIs include a first API (API-1) for LC processing 132 and a second API (API-2) for NLC processing 134. In an example, it is the choice of API by the developer that determines whether an internode message is LC or NLC. Messages sent by node 120a via API-1 (LC) are dispatched without delay to node 120b, whereas messages sent via API-2 (NLC) are typically delayed prior to sending.

Consider, for example, a case where NLC processing 134 on node 120a prepares numerous NLC messages 140-2 at respective times using API-2. Such messages 140-2 are placed in a queue 150a where they are delayed before being sent to node 120b. Eventually, LC processing 132 prepares an LC message 140-1 using API-1. The message handler 160a is alerted to the LC message 140-1 and checks 162 the queue 150a for any NLC messages that may be waiting there. In a reply 164 to the checking 162, the message handler 160a returns the queued NLC messages 140-2. The message handler 160a then packages the NLC messages 140-2 along with the LC message 140-1 into a single, aggregated message 170 and sends the aggregated message 170 to node 120b.

Node 120b receives the aggregated message 170 and unpackages the aggregated message 170 into its individual messages 140, which are then forwarded to their respective destinations on node 120b. The messages may relate to resources, such as blocks, cache pages, descriptors, memory locations, and the like. The messages may be received and responded to by resource managers 190, i.e., software constructs provided for managing the related resources.

One should appreciate that the overhead and delay associated with packaging messages 140 into aggregated messages 170 (and unpackaging aggregated messages 170 into individual messages 140) is typically very small and indeed is negligible. Thus, the benefits of reduced message rate can be achieved without significantly delaying LC messages, which still promptly reach their destinations.

In an example, the aggregated message 170 includes metadata 172, which provides an index of the messages 140 included in the aggregated message 170. For example, the index may identify boundaries between separate messages 140 of the aggregated message 170, which enable the node 120b to parse the aggregated message 170 into the individual messages 140.

In some examples, the storage nodes 120 enforce a maximum allowable size 174 of aggregated messages 170, such as 4 kB, 8 kB, or the like. When checking the queue 152a, the message handler 160a preferably obtains as many NLC messages from the queue 152a as will fit within the maximum size 174, while still providing space for the LC message 140-1 and the metadata 172. For example, if the maximum size 174 is 8 kB and the LC message 140-1 and metadata 172 together require 1 kB, the message handler 160a would attempt to fill the remaining 7 kB with NLC messages from the queue 150a, taking as many as will fit. The message handler 160a preferably takes the oldest NLC messages in the queue 150a first, so as to give older NLC messages priority over newer NLC messages. For example, if additional NLC messages 140-3 are placed in the queue after the NLC messages 140-2 are placed there, message handler 160a takes only the oldest messages that fit, which may include all of the messages 140-2 but none of the additional messages 140-3. The additional massages 140-3 may remain in the queue 150a until the next LC message arrives, or until a timeout is exceeded.

In some examples, the message handler 160a periodically checks the queue 150a for a time associated with the oldest NLC message (e.g., a timestamp associated with the oldest NLC message in the queue 150a). For example, a separate timer task may be provided for this purpose. If the age of the oldest NLC message is older than a predetermined threshold (such as tens of microseconds), the message handler 160a stops waiting for a new LC message to be prepared and instead packages together the oldest NLC messages in the queue 150a, creating a new aggregated message, e.g., one that has as many messages 140 as will fit within the maximum size 174 (considering space for the metadata 172). The message handler 160a then sends the new aggregated message to the second node 120b. In this manner, NLC messages are not left stranded in the queue 150a during times of low I/O activity and the benefits of reduced message rate are still achieved.

By consolidating messages 140 into aggregated messages 170, the depicted arrangement benefits from a greatly reduced rate of messages between storage nodes 120. The overhead associated with processing large numbers of messages, in terms of both computational and networking resources, is therefore reduced, allowing these resources to be used elsewhere. The depicted arrangement also properly aligns with storage-system priorities, sending LC messages without substantial delay, while delaying NLC messages until an LC message is ready to be sent or, in some examples, until a timeout is exceeded.

Figure 2:
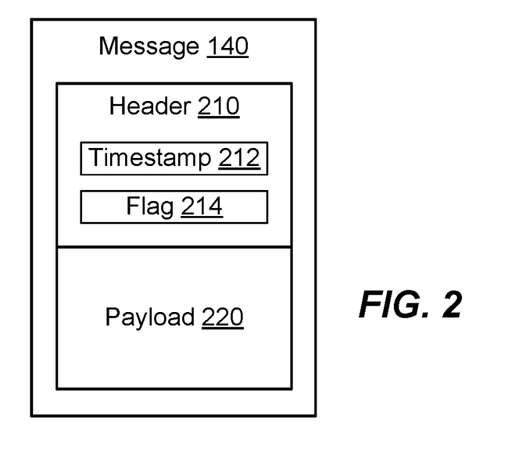
FIG. 2 is a block diagram of an example message that may be sent between storage nodes of FIG. 1.

FIG. 2 shows an example arrangement of a message 140 in greater detail. The message 140 may be representative of the LC message 140-1 and of the NLC messages 140-2. As shown, message 140 includes a header 210 and a payload 220, which carries content of the message 140. The header 210 conveys metadata about the message 140, such as a timestamp 212, which indicates when the message 140 is prepared, and a flag 214. The timestamp 212 may be used by the above-described timer task, e.g., for determining the age of the message so that old NLC messages may be sent even in the absence of LC messages. The flag 214 identifies the API that is used in preparing the message 140, e.g., API-1 or API-2. As will be described in connection with FIG. 5, the storage node 120b may read the flag 214 for a message 140 and use the same API as indicated by the flag 214 in preparing a reply message.

In some examples, only NLC messages include a timestamp 212. For example, a timestamp 212 may be relevant only for NLC messages, which may be delayed in the queue 150a, but may not be needed with LC messages, which are sent to node 120b without delay.

Figure 3:
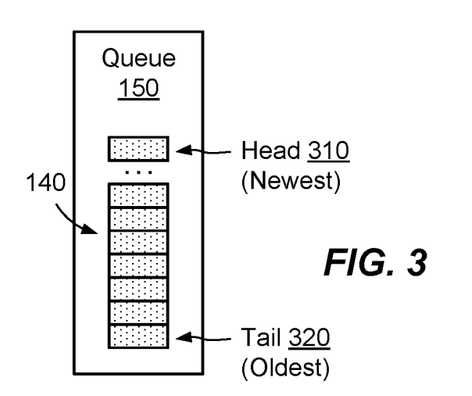
FIG. 3 is a block diagram of an example queue that may be used for temporarily holding non-latency-critical messages to be sent between storage nodes of FIG. 1.
Figure 5:
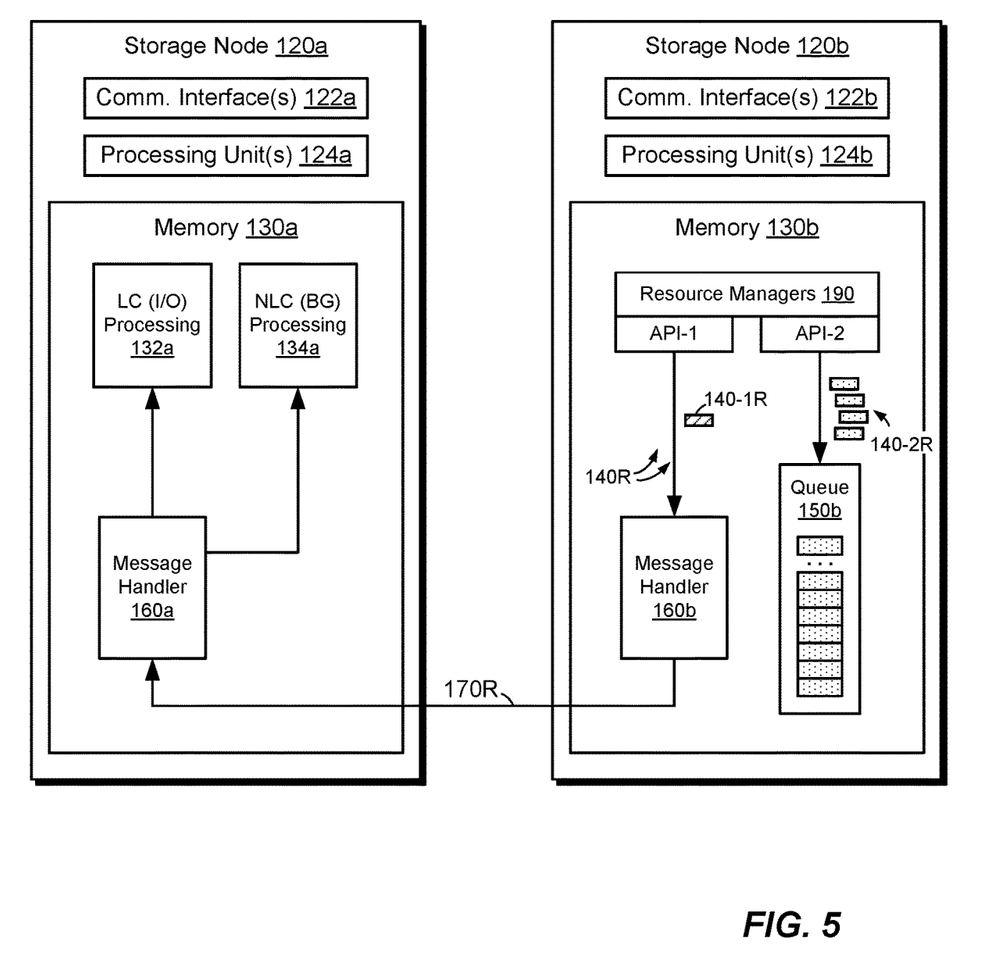
FIG. 5 is a block diagram of an example arrangement for sending reply messages.

FIG. 3 shows an example queue 150 in greater detail. The queue 150 is intended to be representative of queue 150a (FIG. 1) and of queue 150b (FIG. 5). The queue 150 may have a head 310 and a tail 320 and may be time-ordered, with the newest message appearing at the head 310 and the oldest message appearing at the tail 320. NLC processing 134 may insert newly arriving NLC messages at the head 310, while message handler 160a may retrieve oldest messages from the tail 320. Once messages are obtained from the tail 320, e.g., in responses 164 (FIG. 1), the obtained messages may be removed from the queue 150 and the tail 320 may be moved to the location of the oldest message that remains in the queue 150. With this arrangement, the above-described timer task need only check the timestamp 212 of the message 140 at the tail 320 of the queue 150. For example, the timer task obtains the timestamp 212 and subtracts the timestamp 212 from the current time, producing a difference that represents an age of the message at the tail 320, i.e., the oldest message. If the age exceeds the predetermined threshold, the message handler 160a may prepare and send a new aggregate message even in the absence of a new LC message.

Figure 4:
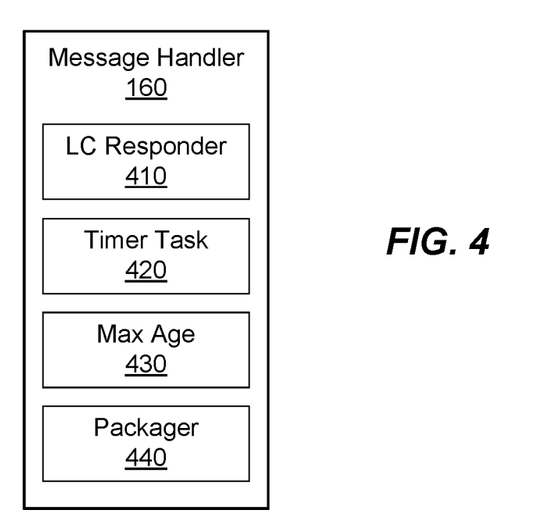
FIG. 4 is a block diagram of an example message handler of FIG. 1.

FIG. 4 shows an example message handler 160 in greater detail. Message handler 160 is intended to be representative of message handler 160a (FIG. 1) and message handler 160b (FIGS. 1 and 5). Example message handler 160 includes the following components:

LC responder 410. Executable code configured to respond to new LC messages by checking the queue 150 for pending NLC messages and activating packager 440 if any are found.

Timer task 420. Executable code, such as a thread, configured to periodically check the timestamp 212 of the oldest NLC message on the queue 150, e.g., once per millisecond, once per 10 milliseconds, once per 100 milliseconds, etc.

Max Age 430. A predetermined limit on the maximum age of the oldest message in the queue 150. If the timer task 420 determines that the current time minus the timestamp 212 of the oldest message exceeds max age 430, timer task 420 activates packager 440 to create and send a new aggregate message 170.

Packager 440. Executable code configured to package an LC message with messages in the queue 150, or to package together NLC messages in the absence of any LC messages, to create aggregated messages 170.

FIG. 5 shows an example arrangement in which storage node 120b responds to messages 140, such as those sent in the aggregated message 170 of FIG. 1. In the example shown, resource managers 190 respond to message 140-1 and to messages 140-2 by preparing reply message 140-1R and reply messages 140-2R, respectively. Resource managers 190 may prepare reply messages 140R individually, i.e., a separate reply message 140R may be prepared for each message 140. In preparing a reply message 140R, a resource manager 190 may read the flag 214 provided in the header 210 of the message 140 to which the reply message 140R is responding. The resource manager may then prepare the reply message 140R using the same API identified by the flag 214. Thus, if message 140-1 was prepared using API-1, reply message 140-1R is prepared using the same API, API-1. Likewise, if a message was prepared using API-2, the corresponding reply message is prepared using API-2. Reply messages 140-2R, which are prepared using API-2, are thus enqueued in queue 150b, where they remain until an LC message is prepared on node 120b or until the max age 430 of the oldest message in queue 150b is exceeded. Reply messages 140R are thus treated the same way as messages 140 in FIG. 1. When an LC message is prepared or max age 430 of the oldest message in queue 150b is exceeded, message handler 160b creates an aggregated message 170R and sends the message 170R back to node 120a. At node 120a, message handler 160a unpackages the aggregated message 170R into individual messages, which then flow to their respective destinations.

One should appreciate that the messages contained in aggregated message 170R need not correspond to the messages contained in aggregated message 170. Rather, the two nodes 120 process their respective messages independently, based on the orders in which the messages are prepared. Indeed, operation of the two nodes 120 may be fully symmetrical with regard to messaging. Thus, node 120b may send messages 140 to node 120a in the same manner as described above for sending messages 140 from node 120a to node 120b. Likewise, node 120a may send reply messages 140R to node 120b in the same way as described for sending reply messages 140R from node 120b to node 120a.

By preparing reply messages 140R using the same API that was used in preparing the respective original messages 140, reply messages are treated the same way as the messages to which they are replying. Thus, replies to LC messages as prepared as LC messages and replies to NLC messages are prepared as NLC messages. The benefits of reduced message rate can therefore be experienced in both directions.

Figure 6:
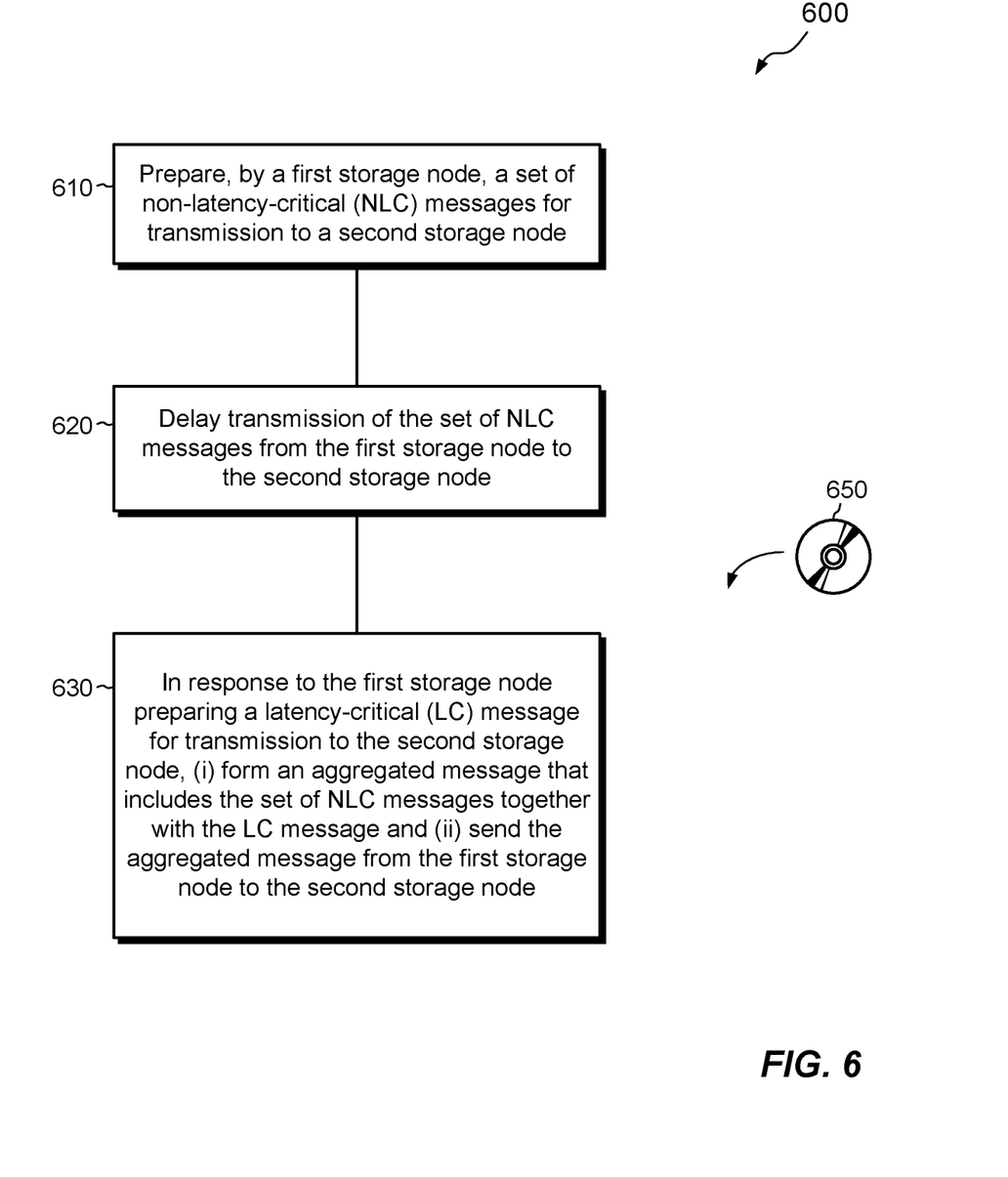
FIG. 6 is a flowchart showing an example method of managing messaging between storage nodes of a data storage system.

FIG. 6 shows an example method 600 of managing messaging between storage nodes of a data storage system. The method 600 may be carried out in connection with the environment 100 and is typically performed, for example, by the software constructs described in connection with FIG. 1, which reside in the memory 130 of each storage node 120 and are run by the respective set of processors 124. The various acts of method 600 may be ordered in any suitable way. Accordingly, embodiments may be constructed in which acts are performed in orders different from that illustrated, which may include performing some acts simultaneously.

At 610, a first storage node 120a prepares a set of non-latency-critical (NLC) messages 140-2 for transmission to a second storage node 120b. The NLC messages 140-2 may relate to background (BG) activities being performed on storage node 120a.

At 620, transmission of the set of NLC messages 140-2 from the first storage node 120a to the second storage node 120b is delayed. For example, NLC messages 140-2 are placed in a queue 150a where they wait for an LC message to arrive or for a time limit to expire.

At 630, in response to the first storage node 120a preparing a latency-critical (LC) message 140-1 for transmission to the second storage node 120b, (i) an aggregated message 170 is formed that includes the set of NLC messages 140-2 together with the LC message 140-1 and (ii) the aggregated message 170 is sent from the first storage node 120a to the second storage node 120b.

An improved technique has been described for managing messaging between storage nodes 120 of a data storage system 116. The technique includes a first storage node 120a delaying the sending of non-latency-critical messages 140-2 to a second storage node 120b until the first storage node 120a has a latency-critical message 140-1 to be sent. The technique further includes combining the non-latency-critical messages 140-2 with the latency-critical message 140-1 to form a single, aggregated message 170, and sending the aggregated message 170 to the second storage node 120b. Advantageously, the improved technique greatly reduces the number of messages sent, avoiding overhead by combining messages and conserving valuable resources, freeing those resources for use in more critical tasks.

Having described certain embodiments, numerous alternative embodiments or variations can be made. For example, although the depicted embodiments pertain to two storage nodes 120a and 120b, embodiments may be extended to any number of storage nodes. Such storage nodes may be located at a single site or may be distributed between or among multiple sites.

Further, although features have been shown and described with reference to particular embodiments hereof, such features may be included and hereby are included in any of the disclosed embodiments and their variants. Thus, it is understood that features disclosed in connection with any embodiment are included in any other embodiment.

Further still, the improvement or portions thereof may be embodied as a computer program product including one or more non-transient, computer-readable storage media, such as a magnetic disk, magnetic tape, compact disk, DVD, optical disk, flash drive, solid state drive, SD (Secure Digital) chip or device, Application Specific Integrated Circuit (ASIC), Field Programmable Gate Array (FPGA), and/or the like (shown by way of example as medium 650 in FIG. 6). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Also, a "set of" elements can describe fewer than all elements present. Thus, there may be additional elements of the same kind that are not part of the set. Further, ordinal expressions, such as "first," "second," "third," and so on, may be used as adjectives herein for identification purposes. Unless specifically indicated, these ordinal expressions are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Also, and unless specifically stated to the contrary, "based on" is intended to be nonexclusive. Thus, "based on" should not be interpreted as meaning "based exclusively on" but rather "based at least in part on" unless specifically indicated otherwise. Although certain embodiments are disclosed herein, it is understood that these are provided by way of example only and should not be construed as limiting.

Those skilled in the art will therefore understand that various changes in form and detail may be made to the embodiments disclosed herein without departing from the scope of the following claims.

What is claimed is:

1. A method of managing messaging between storage nodes of a data storage system, comprising:
    preparing, by a first storage node, a set of non-latency-critical (NLC) messages for transmission to a second storage node;
    delaying transmission of the set of NLC messages from the first storage node to the second storage node; and
    in response to the first storage node preparing a latency-critical (LC) message for transmission to the second storage node, (i) forming an aggregated message that includes the set of NLC messages together with the LC message and (ii) sending the aggregated message from the first storage node to the second storage node,
    wherein the set of NLC messages includes multiple messages for synchronizing background activities of the data storage system, and wherein the LC message is a message for synchronizing a host-initialed I/O request activity of the data storage system.

2. The method of claim 1, wherein delaying transmission of the set of NLC messages includes:
    placing the set of NLC messages in a queue maintained in memory of the first storage node; and
    holding the set of NLC messages in the queue until responding to preparation of the LC message.

3. The method of claim 2, wherein the queue stores additional NLC messages in addition to the set of NLC messages, and wherein forming the aggregated message includes obtaining the set of NLC messages from the queue as a set of oldest NLC messages in the queue.

4. The method of claim 3, wherein forming the aggregated message further includes:
creating an index of messages in the aggregated message; and
incorporating the index as part of the aggregated message.

5. The method of claim 4, wherein the data storage system specifies a maximum size of messages, and wherein forming the aggregated message includes packing as many NLC messages from the queue as fit within the maximum size, while still providing space for the LC message and the index.

6. The method of claim 3, further comprising:
periodically checking the queue for a time associated with an oldest NLC message in the queue; and
in response to a difference between a current time and the time associated with the oldest NLC message exceeding a predetermined threshold, (i) forming a new aggregated message that includes a plurality of oldest NLC messages in the queue and (ii) sending the new aggregated message from the first storage node to the second storage node.

7. The method of claim 2, further comprising:
providing a first API (Application Program Interface) for preparing LC messages; and
providing a second API for preparing NLC messages.

8. The method of claim 7, further comprising:
upon preparing a new NLC message using the second API, placing the new NLC message onto the queue;
upon preparing a new LC message using the first API, (i) checking the queue for NLC messages waiting in the queue and (ii) in response to finding NLC messages waiting in the queue, forming a new aggregated message that includes the new LC message and at least one of the NLC messages waiting in the queue; and
sending the new aggregated message from the first storage node to the second storage node.

9. The method of claim 7, wherein a new message prepared by one of the first API and the second API includes a flag that identifies the API used to prepare the new message, and wherein the method further comprises the second storage node receiving the new message, checking the flag, and preparing a reply message to the new message using the API specified by the flag.

10. The method of claim 9, wherein the new message is received by the second storage node in an aggregated message that includes multiple new messages, the new messages including respective flags that identify respective APIs used in preparing the respective messages, and wherein the method further comprises the second storage node preparing reply messages to the new messages using the respective APIs specified by the respective flags.

11. A computerized apparatus, comprising a first storage node and a second storage node, the first storage node and the second storage node each including control circuitry that includes a set of storage units coupled to memory, the control circuitry constructed and arranged to:
prepare, by the first storage node, a set of non-latency-critical (NLC) messages for transmission to a second storage node;
delay transmission of the set of NLC messages from the first storage node to the second storage node;
in response to preparation by the first storage node of a latency-critical (LC) message for transmission to the second storage node, (i) form an aggregated message that includes the set of NLC messages together with the LC message and (ii) send the aggregated message from the first storage node to the second storage node; and
provide a first API (Applicant Program Interface) for preparing LC messages and provide a second API for preparing NLC messages.

12. The computerized apparatus of claim 11, wherein the set of NLC messages includes multiple messages for synchronizing background activities of the data storage system, and wherein the LC message is a message for synchronizing a host-initiated I/O request activity of the data storage system.

13. The computerized apparatus of claim 11, wherein delaying transmission of the set of NLC messages includes placing the set of NLC messages in a queue maintained in memory of the first storage node and holding the set of NLC messages in the queue until responding to preparation of the LC message.

14. The computerized apparatus of claim 11, wherein the queue stores additional NLC messages in addition to the set of NLC messages, and wherein the control circuitry constructed and arranged to form the aggregated message is further constructed and arranged to obtain the set of NLC messages from the queue as a set of oldest NLC messages in the queue.

15. The computerized apparatus of claim 11, wherein the control circuitry constructed and arranged to form the aggregated message is further constructed and arranged to create an index of messages in the aggregated message and to incorporate the index as part of the aggregated message.

16. A computer program product including a set of non-transitory, computer-readable media having instructions which, when executed by control circuitry of a computerized apparatus, cause the computerized apparatus to perform a method of managing messaging between storage nodes, the method comprising:
preparing, by a first storage node, a set of non-latency-critical (NLC) messages for transmission to a second storage node;
delaying transmission of the set of NLC messages from the first storage node to the second storage node, said delaying including placing the set of NLC messages in a queue maintained in memory of the first storage node and holding the set of NLC messages in the queue until responding to preparation of the LC message; and
in response to the first storage node preparing a latency-critical (LC) message for transmission to the second storage node, (i) forming an aggregated message that includes the set of NLC messages together with the LC message, said forming including creating an index of messages in the aggregated message and incorporating the index as part of the aggregated message, and (ii) sending the aggregated message from the first storage node to the second storage node.

17. The computer program product of claim 16, wherein the first storage node specifies a maximum size of messages, and wherein forming the aggregated message includes packing as many NLC messages from the queue as fit within the maximum size, while still providing space for the LC message and the index.

18. The computer program product of claim 16, wherein the method further comprises:
providing a first API (Application Program Interface) for preparing LC messages; and
providing a second API for preparing NLC messages.

19. The computer program product of claim 18, wherein the method further comprises:
- upon preparing a new NLC message using the second API, placing the new NLC message onto the queue;
- upon preparing a new LC message using the first API, (i) checking the queue for NLC messages waiting in the queue and (ii) in response to finding NLC messages waiting in the queue, forming a new aggregated message that includes the new LC message and at least one of the NLC messages waiting in the queue; and
- sending the new aggregated message from the first storage node to the second storage node.

20. The computer program product of claim 18, wherein a new message prepared by one of the first API and the second API includes a flag that identifies the API used to prepare the new message, and wherein the method further comprises the second storage node receiving the new message, checking the flag, and preparing a reply message to the new message using the API specified by the flag.

* * * * *